Figure 1:
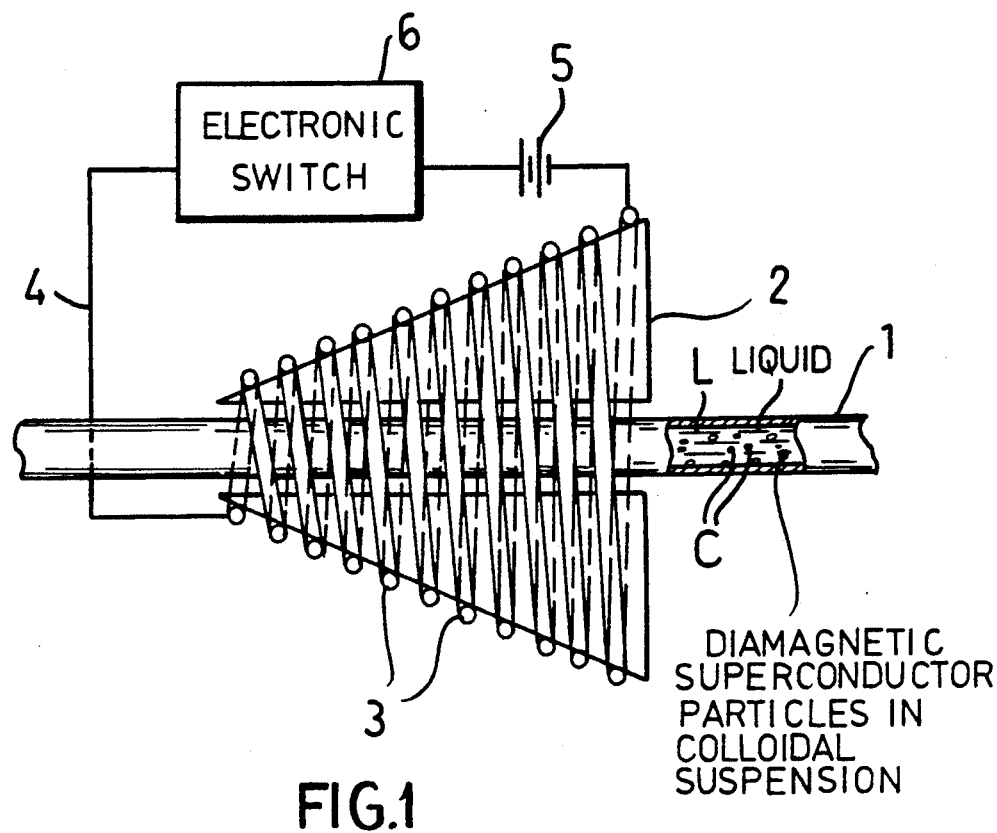

United States Patent [19]

Hed

[11] Patent Number: 5,026,681
[45] Date of Patent: Jun. 25, 1991

[54] DIAMAGNETIC COLLOID PUMPS

[75] Inventor: Aharon Z. Hed, Nashua, N.H.

[73] Assignee: International Superconductor Corp., Riverdale, N.Y.

[21] Appl. No.: 334,581

[22] Filed: Mar. 21, 1989

[51] Int. Cl.$^5$ ............................................. H02K 44/02
[52] U.S. Cl. ........................................ 505/1; 417/50; 310/11
[58] Field of Search ............................ 417/50; 310/11; 290/212, 232; 505/1

[56] References Cited

U.S. PATENT DOCUMENTS

| 731,044 | 6/1903 | Gates | 209/212 |
| 4,526,681 | 7/1985 | Friedlaender et al. | 209/232 |
| 4,808,079 | 2/1989 | Crowley et al. | 417/50 |
| 4,809,354 | 2/1989 | Kawashima | 417/50 |

FOREIGN PATENT DOCUMENTS

| 1123643 | 5/1989 | Japan | 209/212 |
| 0642503 | 1/1979 | U.S.S.R. | 417/50 |
| 0931959 | 5/1982 | U.S.S.R. | 417/50 |
| 1139506 | 2/1985 | U.S.S.R. | 209/212 |

Primary Examiner—Leonard E. Smith
Assistant Examiner—David W. Scheuermann
Attorney, Agent, or Firm—Herbert Dubno

[57] ABSTRACT

Colloids that are formed by the suspension of superconducting particles in liquids and gases are moved under the influence of external magnetic fields. The devices described have the unique advantage of being capable of moving and manipulating such colloids without resorting to mechanically moving and actuated parts. The apparatuses described have the additional advantage that they allow the control of the flow rate of such pumped colloids by electrical, magnetic or electronic means.

14 Claims, 3 Drawing Sheets

DIAMAGNETIC COLLOID PUMPS

CROSS REFERENCE TO RELATED APPLICATION

This application relates to my copending application Ser. No. 07/281,832 filed Dec. 8, 1988 entitled "DIAMAGNETIC COLLOIDS CONTAINING SUPERCONDUCTING PARTICLES".

FIELD OF THE INVENTION

The present invention relates to pumps and other devices for moving and manipulating a new family of unique fluids having the property that, when they are exposed to a magnetic field gradient, they will move in the direction of the declining magnetic field.

BACKGROUND OF THE INVENTION

In my above-mentioned co-pending application entitled "Diamagnetic Colloids Containing Superconducting Particles", I have described my invention of a new family of colloids which I have formed by mixing in a liquid a dispersion of particles that are superconducting. I have shown in the same cited application that such particles can be kept in suspension indefinitely in the presence of a magnetic field, and thus the suspension behaves as a perfect colloid as long as that magnetic field is present. I have also shown that this surprising behavior is probably due to the Meissner effect on each particle and the resulting mutual magnetic field expulsion. I have termed these unique colloids "Diamagnetic Colloids", and this term is used herein.

Until recently, it was believed that superconductivity above 23° K. is not possible. This belief was rooted in the theoretical work now named the BCS (Bardeen, Cooper and Schrieffer) theory which predicted such an upper limit. As a result no research in the field of emulsions and suspension of superconducting particles in liquids can be cited. Under 23° K., all matter except helium and hydrogen assumes the solid state, thus limiting the application of such colloids.

The highest temperature at which superconductivity occurs in a superconductor (in the absence of any external magnetic fields) is termed the critical temperature of that superconductor and this term will be used herein.

In the early 1970's a number of theoretical proposals were presented, suggesting that the critical temperature for superconductivity could be increased. (V. L. Ginzburg, Usp. Fiz. Nauk. 101, 185 (1970)) (D. Allender, J. Bray, J. Bardeen, Phys. Rev. B8, 4433 (1973)), but the lack of any discoveries of superconductivity above 23° K., solidified the belief that indeed this critical temperature cannot be exceeded. A significant experimental breakthrough in high temperature superconductivity (critical temperatures in excess of 23° K.) was provided in November 1986 by Bednorz and Muller when they published a tentative disclosure of high temperature superconductivity (Georg Bednorz and Alex Muller, Z. Phys. B64, 189 (1986)), which was rapidly confirmed by others; for instance, a report, cites a critical temperature above 30° K. for $La_{(2-x)}Ba_{(x)}CuO_{(4-y)}$, (H. Takagi, S. Uchida, K. Kitazawa, S. Tanaka, Jpn. J. Appl. Phys. 26, L123 (1987)).

Confirmation of a critical temperature of 93° K. was reported by Chu for yttrium-barium-copper oxide ceramic (M. K. WU, J. R. Ashburn, C. J. Tang, P. H. Hor, R. L. Meng, L. Gao, Z. J. Huang, Y. Q. Wang, and C. W. Chu, Phys. Rev. Lett. 58, 2 Mar., 1987, p. 908.) This material was dubbed the 123 compound and served as a model for advanced research in the field.

During 1987 and 1988, a number of families of high temperature superconductors where discovered with confirmed critical temperatures all the way to 162° K. These materials are usually ceramics containing copper (some of which must be in the trivalent state), an alkaline metal (Ca, Sr, or Ba) and a rare earth including Yttrium.

There are some scattered reports of superconductivity above 162° K., for instance by R. G. Kulkarui who reports superconducting oxides having an approximate composition $(CaO)_{0.5}(ZnO)_{0.5}Fe_2O_4$, and also Ogushi reporting superconductivity at room temperature in yet ill-defined niobium strontium lanthanum oxides. While these reports have yet to be confirmed independently by other researchers, it is reasonable to expect superconductors with critical temperatures at room temperature to become available in the near future.

OBJECTS OF THE INVENTION

With the advent of so many materials superconducting at high temperatures where a large number of liquid media are available, I have researched the behavior of liquids in which superconducting particles are present and developed new unique colloids as described in the co-pending application cited above. I have found that a new family of colloids, which differ markedly from the prior colloid art, in that these colloids require no chemical treatment for stabilization of the suspension. These colloids can be obtained by the use of superconducting particles in any carrier under the influence of a magnetic field. Furthermore, I have determined that if such superconductor particles are suspended in a liquid, the suspension will behave as natural colloid, without the need for additional chemical colloidizing agents. I have further found that these diamagnetic colloids can be moved in tubular structures or in other vessels or on flat surfaces by the judicious control of the magnetic field spatial and temporal distribution on these colloids. It is therefore, an object of the present invention is to provide means to move and pump these new diamagnetic colloids.

Another object is to move and pump these diamagnetic colloids with devices that have no moving parts.

Yet another object of the instant invention is to provide devices and pumps that are actuated magnetically or electrically and can be controlled electronically.

Yet another object is to move and pump diamagnetic colloids using a fixed magnetic field with appropriate topologies that can be moved relative to the diamagnetic colloid to cause the desired movement or pumping action.

SUMMARY OF INVENTION

Pumping a diamagnetic colloid is achieved by exposing one segment of a tube containing the diamagnetic colloid to a magnetic field with a negative field strength gradient in the direction in which the colloid is to be moved. Namely, the magnetic field strength is lower in the direction of desired movement of the colloid. The means used for this purpose creates either a magnetic field that can be modified electrically or electronically, or fixed magnetic field structures that can be moved mechanically relative to the diamagnetic colloid containment vessel or conduit.

The uses of the colloid pump include: pumping of diamagnetic colloids, generally, and the movement and pumping of cryogenic fluids., in heat exchangers and in refrigeration systems.

The invention, therefore, provides pumps or pumping stations for displacing diamagnetic colloids, or for otherwise exerting force on such diamagnetic colloids. Most pumping devices in the prior art, involve the mechanical (mostly reciprocal or rotary) application of forces to the pumped fluid. In the instant invention, forces are applied to a diamagnetic colloid by exposing the colloid to a magnetic field gradient. The resulting force on each individual particle is proportional to the product of the demagnetization factor, the magnetic field and the magnetic field gradient. The magnetization factor relates to the superconducting particles. Since these are type II superconductors, the Meissner effect is not always complete. When the Meissner effect is complete, the magnetization factor is 1, meaning that the particles are perfectly diamagnetics, and thus the force on such particles is maximal. When the particles allow partial field penetration, the magnetization factor is reduced to a number between 0 and 1. The number can be taken as the ratio of the magnetic flux within the particles to the applied magnetic field.

I have termed the specific device that applies the magnetic field gradient on the diamagnetic colloid a "pumping station". Some specific designs of such pumping stations are given below.

I have found that the forces applied by the magnetic field gradient in a pumping station on the superconducting particles within the diamagnetic colloid are transferred to the carrier liquid via wetting and surface tension forces between the carrier liquid and the superconducting particles. These forces are complex and I have not attempted to fully analyze them. I have found, however, that entrainment of the liquid with the movement of the particles due to said forces occurs.

To achieve pumping, I have provided the vessel (usually a tube of circular cross section, but not necessarily or such cross section nor necessarily a tube), in which the colloid is moved with one or more magnetic pumping stations. The station is powered intermittently to provide the progressive driving force on the liquid. One of the reasons for intermittent operation, is to provide for diamagnetic colloid entry into the pumping station when the magnetic field gradient is not applied. Stray magnetic fields from adjacent stations as well as other sources (like the natural magnetic field of the earth) are often sufficient to keep the diamagnetic colloid stable.

I have found that on a microscopic base, while energizing the pumping station, some change in particle distribution in the liquid (or gas) occurs, with particles within the station moving down the magnetic field gradient and entraining their carrying liquid, while at the high field part of the station, mostly the carrier liquid enters the station leaving some of the superconducting particles on the outside of the pumping station. Upon de-energizing of the pumping station, the particle distribution reestablishes itself, thus filling the station with diamagnetic particles and readying the station for the next energization. I have found that faster particle redistribution occurs when a residual magnetic field which is homogeneous exists in the piping. I have established such a residual field by simply coiling a single long wire around the conduit with a small (sometimes, persistent) current through it. For many applications, the need for rapid reestablishment of the particle distribution is not critical and therefore not used. The residual magnetic field from the pumping stations are usually sufficient to keep the diamagnetic colloid in suspension, during the operation of the system, and the said coil is not required for this purpose.

I have further found that the efficiency of this system is particularly good with carriers having low compressibility and high wetting between the particles and the carrier medium.

I have found it more difficult to pump aerosols with the same system. I have therefore sought to improve the efficiency of pumping of diamagnetic aerosols by enhancing the coupling (mechanical) between the particles and the gaseous carriers. I have found that using porous particles, and particles having very irregular surfaces or multiplicity of microprotrusions strongly improve the pumping of diamagnetic aerosols.

While a single pumping station is often sufficient for moving incompressible diamagnetic colloids, I have found that by arranging a number of pumping stations in series along the conduit containing the diamagnetic colloid, and powering said stations consecutively for a short period each, more efficient macroscopic movement of the diamagnetic colloid occurs.

A number of different mechanisms to achieve such magnetic gradients and thus pumping stations of the instant invention are feasible, and few such devices are described herein.

The simplest pumping station consists of a tube around which a conducting coil is wound on a structure which is a triangle of revolution, or a similar form with an increasing cross section in the direction of the desired pumped colloid's movement. The inner cross section of the tube does not necessarily conform to the change in the cross section of the coil. In most applications, it is desired that the inner cross section of the fluid carrying tube would remain constant. When it is desired to actually build a large pressure difference, general principles well known in the prior art involving an inner cross section that is declining in the direction of movement can provide the desired pressurization.

BRIEF DESCRIPTION OF THE DRAWING

The above and other objects, features and advantages of my invention will become more readily apparent from the following description, reference being made to the accompanying highly diagrammatic drawing in which:

FIG. 1 is a diagrammatic elevational view of an apparatus for carrying out the method of the invention;

FIG. 2 is a cross sectional view through a modification of that apparatus;

FIG. 3 is a diagrammatic section illustrating the principals of another apparatus according to the invention;

FIG. 4 is a diagrammatic section showing yet another system for generating a magnetic field gradient according to the invention; and

FIG. 5 is a perspective view diagrammatically illustrating another embodiment of the invention.

SPECIFIC DESCRIPTION

In FIG. 1 I have shown a pumpint station with a fixed inner cross section. Around a tubular structure 1 containing the diamagnetic colloid C in a liquid L 3 is wound on a conical structure 2. The structure has usually a cylindrical hollow in which the tubular structure can fit. The conical structure can be either hollow or solid but must be magnetically permeable. For most purposes, glass, nylons, polystyrenes and other polymers can be used.

The ends of the coil 3 are connected to leads 4 that complete an electrical circuit containing a DC source 5 and an electronic switch 6. The electronic switch is capable of regulating the rate at which the pumping station is activated, as well as the current intensity through the coil, thus providing full control of the pumping of the colloid in tube 1.

When a fixed current is applied to such a coil, a magnetic field whose direction is essentially along the axis of the tube is created (in actuality, the magnetic field vector direction points slightly toward the tube wall, with an inclination that progressively increases toward the large base of the cone). The flux density of the field decreases along the axis of the tube since the flux is distributed over a progressively larger area as one moves down the coil. The center of the tube becomes the locus of minimum magnetic field for all planes perpendicular to the tube, and the magnetic field itself decreases toward the large base of the cone.

It will be clear to a person skilled in the art that since the pumped liquid must be at a temperature below the critical temperature of the superconducting particles in the diamagnetic colloid, one can use for the coil of such pumping station a superconducting wire, so as to limit energy losses in the operation of the pump to almost the actual energy expenditure required to move the diamagnetic colloid.

Figure 2:
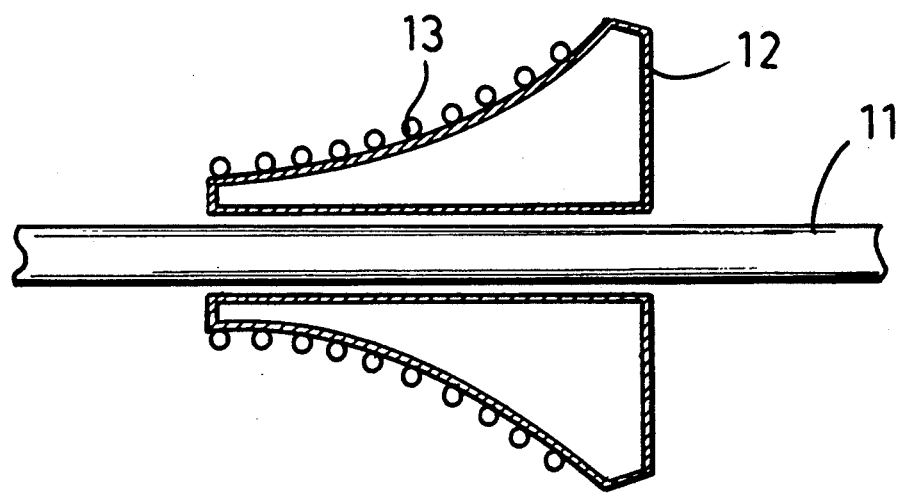

In FIG. 2, I have shown a similar structure wherein the diameter support 12 for the coil 13 increases as a power of the distance along the tube 11, thus creating a more pronounced field gradient.

It should be clear that the support cone can be created by rotating along the axis of the tube any form that is a monotonously increasing function of the distance from the narrow part of the cone, thus creating a variety of field gradients along the tube, all having in common that the direction of the declining field is from the narrow part of the cone to the wide part of the cone.

Another pumping configuration includes a magnetic field perpendicular to the direction of movement of the colloid, with declining flux density gradient in the direction of the movement of the colloid, such a field, as above, being imposed intermittently and acting as a gate or valve.

I have determined that one implementation of such a field topology can be easily achieved by positioning an electromagnet either perpendicular to the tube or in line with the tube. In the latter case, I have used an electromagnet whose yoke is split to allow free passage of the tube. Since the yoke of such electromagnet is ferromagnetic, the completion of the magnetic circuit does not include an appreciable amount of flux lines within the empty space created by the split yoke where the tube is inserted.

The form of the electromagnet can be a simple "U", a horse shoe form or a "C" form.

In order to create a strong gradient in the direction of the flow, I have used poles (of the electromagnet) that are broadened gradually toward the gap, and the gap is gradually increased in the direction of the flow, a technique usually known in the prior art for forming magnetic field gradients between fixed poles of a magnet.

It should be clear to one skilled in the art that the electromagnet can also assume many other forms (including asymmetric forms) that can create a magnetic field flux gradient in the desired direction.

The flow rate of the pumped diamagnetic colloid can be controlled by the frequency of powering the pumping stations and the intensity of the magnetic fields and field gradients imposed. An upper limit to the magnetic field is, however, set by the critical magnetic field of the superconducting particles in the diamagnetic colloids. For most practical purposes, I have found that this upper limit is rarely reached if the diamagnetic colloid is operated at temperatures under 90% of the superconducting particles critical temperatures and the maximum magnetic fields are under about 1 tesla.

I have found that both families of pumping stations described above can be implemented electronically, and I have further found that one can mix pumping stations of the variable cross section solenoid type with the electromagnet horse shoe type in a single system.

Figure 3:
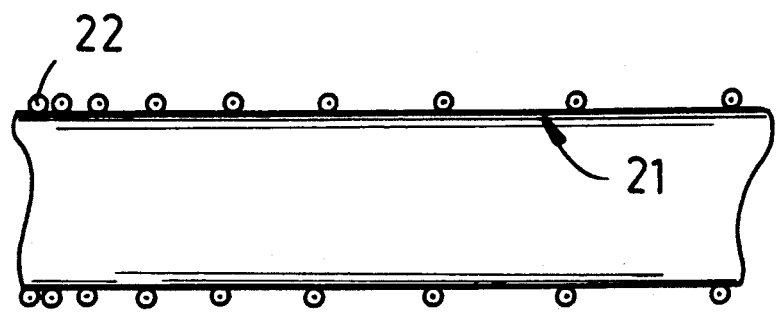
Figure 4:
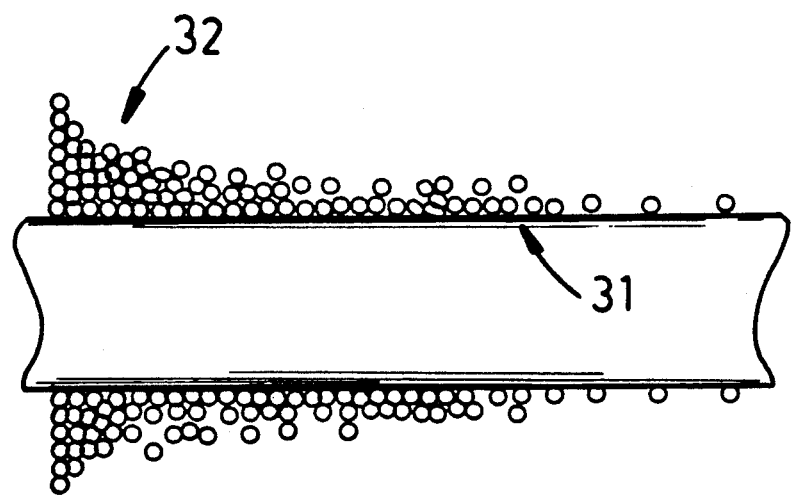

Yet another family of solenoid-like pumping stations is shown in FIG. 3 and FIG. 4. In FIG. 3 I show the diamagnetic colloid carrying tube 2 on which a coil 22 is wound, having a distance between the winding progressively increasing toward direction in which the liquids need be pumped. In FIG. 4, a similar effect is achieved, by progressively decreasing the number (or density) of windings 32 around the tube 31 in the direction in which the liquid is to be pumped.

SPECIFIC EXAMPLES

1. When pumping cryogenic liquids like $N_2$, $H_2$ or $O_2$ major technical problems involve sealing between the mechanical pump (rotary or reciprocal) and the power source. As a result, in many applications, a portion of the liquid is allowed to evaporate and thus create a pressure which is used to move the liquid part of the cryogen. This procedure is wasteful of the cryogen and involves uneven flow of the cryogens as well as potential overpressure buildup hazards. An alternative controlled pumping is achieved by using the instant invention. Specifically, the cryogen is converted to a diamagnetic colloid by dispersing within it 5% to 15% by volume of a high temperature superconductor, for instance $YBa_2Cu_3O_{(7-x)}$, in the form of a powder having a particle size averaging 10 microns. A tubular structure that is either immersed in the cryogen or is connected to the cryogen dewar near its bottom is provided of a nonmagnetic material. A number of pumping stations (at least two) as described in FIG. 1 are positioned around the tubular structure and are actuated in sequence and cyclically so as to effect pumping of the cryogen from the dewar. This example is particularly effective in a number of applications when recovery of the superconducting particles is either unnecessary or convenient.

Figure 5:
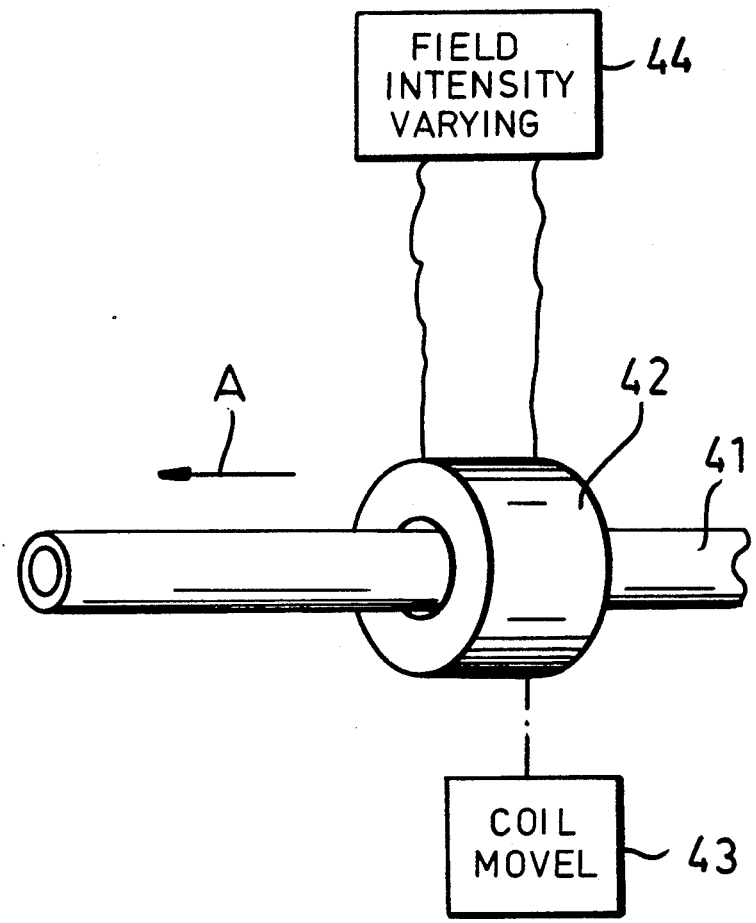

2. In regenerative magnetic heat pumps, it is desired to move continuously in a close cycle in a continuous tube (heat exchanger) a cryogenic liquid like $F_3COF$. (Hypofluorous Acid Trifluoro Methyl Ester). In the prior art this problem is very difficult to resolve due to sealing problems. I have solved that problem by converting $F_3COF$ to a diamagnetic colloid and using this diamagnetic colloid as the regenerative moving medium. The $F_3COF$ based diamagnetic colloid was obtained by putting in the heat exchanger tubular structure powder (particle size in the range of 10 to 15 microns) of the 123 high temperature superconducting compound known as 123 ($YBa_2Cu_3O_{(7-x)}$) and filling the heat exchanger to about 10% of its volume. At three locations around the closed cycle heat exchanger, tubular inserts of nonmagnetic stainless steel are made to be part of the closed cycle regenerative heat exchanger, and pumping stations as described in FIG. 3 are mounted over these tubular parts. The three pumps are actuated sequentially and intermittently to cause a slow but continuous movement of the regenerative heat exchanging medium so as to move in a direction opposite the movement of the active magnetic medium in the magnetic heat pump. In FIG. 5 I have shown another way of generating the varying magnetic field gradient for displacing the colloid and hence the liquid entrained thereby.

A tube 41 through which the colloid and its carrier liquid can be displaced is surrounded by a solenoid or magnetic 41 which is displaceable in the direction of arrow A by a coil mover 43. The coil is energized by the power supply 44 which enables the field intensity to be generated.

It is understood that the above described embodiments of the invention are illustrative only and modifications and alterations thereof may occur to those skilled in the art. Accordingly, it is desired that this invention not be limited to the embodiments disclosed herein but is to be limited only as defined by the appended claims.

I claim:

1. A method of pumping a liquid, comprising the steps of:
   (a) dispersing an amount of superconducting particles in said liquid sufficient to enable the resulting dispersion to be displaced by a magnetic field;
   (b) maintaining said particles at a temperature below the critical temperature for superconductivity thereof; and
   (c) moving said liquid in which said particles have been dispersed by applying a varying magnetic field gradient thereto.

2. A pump for displacing a flowable diamagnetic colloid, comprising:
   a tube traversed by said diamagnetic colloid; and
   magnetic means at said tube for applying a varying magnetic field with an anisotropic flux distribution to the diamagnetic colloid in said tube with a declining flux density in a direction in which said colloid is to be moved.

3. The pump defined in claim 2 wherein said magnetic means is a magnet moveable along said tube, and means for varying velocity of movement of said magnet, to vary a flow rate of said colloid.

4. The pump defined in claim 2 wherein said magnetic means is a solenoid surrounding said tube and having a cross sectional area increasing in said direction, means for selectively energizing said solenoid with direct current, and means for varying a magnetic field gradient generated by said solenoid to vary a flow rate of said colloid.

5. The pump defined in claim 4 wherein said solenoid is a coil wound on a hollow form receiving said tube and having an external surface diverging from said tube in said direction.

6. The pump defined in claim 2 wherein said magnetic means is a solenoid surrounding said tube and having a winding density decreasing in said direction, means for selectively energizing said solenoid with direct current, and means for varying magnetic field intensity of said solenoid to vary a flow rate of said colloid.

7. The pump defined in claim 2 wherein said magnetic means is a magnet movable along said tube and means for varying a magnetic field gradient generated by said magnetic to vary a flow rate of said colloid.

8. The pump defined in claim 2 wherein said magnetic means is a magnet movable along said tube and means for varying a magnetic field intensity of said magnet to vary a flow rate of said colloid.

9. The pump defined in claim 2 wherein said magnetic means is a solenoid surrounding said tube and having a cross sectional area increasing in said direction and, means for selectively energizing said solenoid with direct current and means for varying velocity of movement of said solenoid along said tube.

10. The pump defined in claim 2 wherein said magnetic means is a solenoid surrounding said tube and having a cross sectional area increasing in said direction and, means for selectively energizing said solenoid with direct current and means for varying a rate of switching said solenoid on and off.

11. The pump defined in claim 2 wherein said magnetic means is a solenoid surrounding said tube and having a cross sectional area increasing in said direction and, means for selectively energizing said solenoid with direct current and means for varying magnetic field gradient generated by said solenoid to vary a flow rate of said colloid.

12. The pump defined in claim 2 wherein said magnetic means is a solenoid surrounding said tube and having a velocity density increasing in said direction, means for selectively energizing said solenoid with direct current, and means for varying a velocity of movement of said solenoid along said tube to vary a flow rate of said colloid.

13. The pump defined in claim 2 wherein said magnetic means is a solenoid surrounding said tube and having a velocity density decreasing in said direction, means for selectively energizing said solenoid with direct current, and means for varying a rate of switching said solenoid on and off to vary a flow rate of said colloid.

14. The pump defined in claim 2 wherein said magnetic means is a solenoid surrounding said tube and having a velocity density decreasing in said direction, means for selectively energizing said solenoid with direct current, and means for varying a magnetic field gradient generated by said solenoid to vary a flow rate of said colloid.

* * * * *